Figure 1:
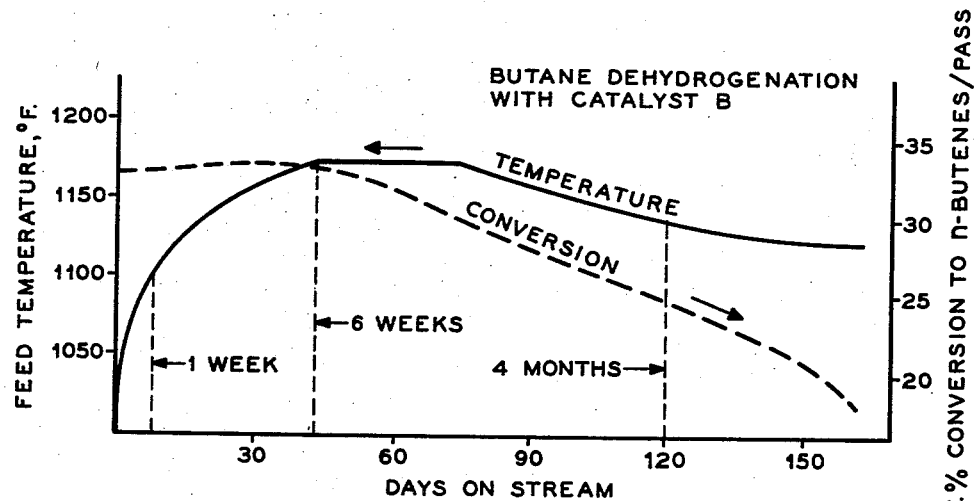

United States Patent Office 3,189,661
Patented June 15, 1965

3,189,661
DEHYDROGENATION PROCESS AND
CATALYSTS THEREFOR
Bernard F. Mulaskey, El Sobrante, Robert H. Lindquist, Berkeley, and Hugh F. Harnsberger, San Anselmo, Calif., assignors to California Research Corporation, San Francisco, Calif., a corporation of Delaware
Filed Nov. 25, 1960, Ser. No. 71,821
3 Claims. (Cl. 260—680)

This invention relates to the preparation and use of supported Group VI metal oxide dehydrogenation catalysts. In particular, the invention is concerned with the use of a chromia-alumina catalyst of unusual properties in the dehydrogenation of aliphatic hydrocarbons containing 2–5 carbon atoms to the molecule for the preparation of the corresponding olefins and diolefins.

A dehydrogenation process of great interest at the present time is the production of butene and butadiene from butane. The butane dehydrogenation process finding widest acceptance commercially is the so-called adiabatic cyclic fixed bed process, wherein normal butane at elevated temperatures of 900–1200° F. is passed at subatmospheric pressures in the range 1–10 p.s.i.a. through a bed of chromia-alumina catalyst particles preheated to the reaction temperature, at a space velocity of 0.5–3 v./v./hr. (volumes of butane per volume of catalyst per hour). Usually, heat retentive catalytically inert refractory solids are mixed with the catalyst, the heat required for the endothermic dehydrogenation reaction being abstracted from the preheated catalyst and inert solids. The temperature of the catalyst bed decreases as it gives up heat absorbed by the reaction, and at the same time a carbonaceous deposit or coke is laid down on the catalyst. The feed is stopped after an on-stream period of 5–30 minutes. The bed is then contacted with a heated stream of oxygen-containing gas for an equivalent length of time, which serves to burn off the carbonaceous deposit and thereby to restore the bed to the initial elevated temperature, whereupon the cycle is repeated. Patent No. 2,474,014 to J. E. Seebold describes procedures for carrying out the regeneration step.

As a modification of the fixed bed process it has been proposed to conduct the operation using a finely divided catalyst and providing for the requisite short contact time between the feed and catalyst by use of a transfer line reactor. The entrained catalyst is separated, regenerated by combustion of the deposited coke to raise the catalyst temperature, and then admixed with additional fresh feed, the catalyst again serving to supply the endothermic reaction heat. In either process scheme the catalyst is alternately and repeatedly exposed at frequent intervals to hydrocarbon vapors under conversion conditions and to oxygen containing gases under regeneration conditions. The processes are applicable to the catalytic dehydrogenation of aliphatic hydrocarbons having 2–5 carbon atoms to the molecule.

Under such severe conditions of alternate reaction and regeneration at frequent intervals, the catalysts heretofore used decline rapidly in dehydrogenation activity. If only moderate temperatures are used and low conversion rates are accepted, the process may be kept on-stream for 8–12 months. Typically, however, under optimum conditions the maximum catalyst life heretofore has been 3–6 months, rarely exceeding 5 months. The expense involved in replacing the catalyst at such intervals is a major cost factor in the process. Accordingly, it would be highly desirable to be able to extend the period of time for which the catalyst has high activity, whereby the time between catalyst replacements could be extended.

It is an object of this invention to provide a dehydrogenation catalyst which maintains its high activity under the rigorous conditions of alternate reaction and regeneration. Another object is to provide an active dehydrogenation catalyst which is not overly active initially but which is characterized by increasing activity during the initial period of use and which maintains high activity for a much longer time than catalysts heretofore used. Still another object is to increase the per pass conversion of aliphatic hydrocarbons to olefins by using such a catalyst in the dehydrogenation process.

With these objects in mind the present invention is directed to a process of dehydrogenation with a catalyst which has suppressed or hidden activity, i.e., latent capabilities which are developed during use of the catalyst to counteract the activity decline normally observed heretofore during the operation of the process.

By way of background (although the theory presented is not intended to be limiting), the vast extended surface of a fresh chromia-alumina dehydrogenation catalyst is pictured as comprising predominantly alumina with numerous small chromia particles distributed thereon and covering only a minor fraction of the alumina surface. Loss of active chromia surface area, and hence activity decline in such catalysts, are believed to be caused by: (a) sintering of the chromia particles into larger clumps which give a smaller total active surface area, and (b) chromia diffusing into the alumina to form solid solutions. Sintering is accelerated by high temperatures in both oxidizing and non-oxidizing atmospheres. Diffusion is accelerated by high temperatures in oxidizing atmospheres. Since in the dehydrogenation process the catalyst is alternately and repeatedly exposed to high temperatures in non-oxidizing atmospheres during the reaction period and to high temperatures in oxidizing atmospheres during the regeneration period, the catalyst declines rapidly in activity. Further, at certain conditions of high temperatures in oxidizing atmospheres active chromia from the clumps is transported onto the alumina surface. By magnifying this transport effect over and above the sintering and diffusion effects, chromia surface area and catalyst activity are increased during use, in accordance with the present invention.

We have discovered that a catalyst of the desired properties can be prepared by treating a high-area alumina support at elevated temperatures for several hours to reduce the alumina surface area, then impregnating the treated alumina with a chromium compound to provide about 20–40 weight percent $Cr_2O_3$ in the finished catalyst, and then heating the impregnated catalyst at an elevated temperature for several hours in an oxygen-free and non-oxidizing atmosphere, such as nitrogen. Preferably, the catalyst is also promoted with a small quantity of potassium oxide. The activity and chromia surface area of the resulting catalyst actually increase with age up to a maximum value, and thereafter the catalyst declines in activity and chromia surface area more slowly than do the previously known catalysts.

The final heat treatment of the catalyst in a non-oxidizing atmosphere at elevated temperatures is continued for a sufficient time to sinter the chromia into clumps larger than would ordinarily be formed as a result of normal deactivation. To do this and still have a catalyst of adequate initial dehydrogenation activity requires the use of unusually high chromia concentrations in the catalyst. The active chromia surface area is reduced below that of ordinary catalysts having lower chromia contents. The chromia clumps then have very little tendency to sinter into larger clumps during the on-stream portion of the process cycle. Instead, the chromia has an increased tendency to be transported onto the alumina during the regeneration portion of the cycle to cause gradually increasing chromia surface area and activity. Thereafter, the activity declines only as a result of the diffusion of chromia into the alumina to form solid solutions, and this effect is less marked when the active chromia is initially disposed as larger isolated clumps on the alumina, in accordance with the invention. The treatment under non-oxidizing conditions is also important in that the formation of $Cr^{+6}$ species on the catalyst is thereby avoided during the preparation. Hexavalent chromium appears to be deleterious in accelerating sintering of the alumina support.

In the preparation of conventional chromia-alumina dehydrogenation catalysts heretofore, it has been customary to provide a finished calcined catalyst containing 10–20 percent $Cr_2O_3$. The preparation of chromia-alumina catalysts containing up to 40 percent $Cr_2O_3$ has been previously suggested. However, we have found that when such a high chromia content catalyst is prepared by conventional procedures, the catalyst has such a high initial activity that it cannot successfully be started up in the cyclic adiabatic dehydrogenation process without resort to a protracted break-in period. Moreover, once the initial "wildness" of such a catalyst has worn off, the dehydrogenation activity declines equally as rapidly as the lower chromia content prior-art catalysts. It appears that at such high chromium levels hexavalent chromium formed during air calcination, i.e., as $CrO_3$, acts as a flux which accelerates sintering of the alumina during the calcining step and also during the regeneration phase of the plant operation. Catalysts prepared in accordance with this invention have better startup characteristics in that the catalyst is not overly active initially. Similarly, there are references in the prior art to the use of a hydrogen reduction treatment of chromia-alumina catalysts instead of the usual final air calcination. However, it is found that when a conventional chromia-alumina catalyst is treated with hot reducing gas or nitrogen at 1600° F. for several hours, the catalyst is substantially completely deactivated. Thus, it is apparent that the unusual properties of our novel catalyst are attributable to no single treating step but rather are due to the combination of steps comprising the method of preparation.

The hydrous alumina gel used as the starting material in the preparation of the catalyst of this invention may be any high surface area synthetic or natural alumina, such as boehmite or bayerite, in the form of small particles or as a powder. Alternately, the alumina gel can be prepared, for example, by the addition of ammonium hydroxide or other alkaline agent to an acidic aqueous solution of aluminum sulfate, nitrate, chloride, or other salt. The resulting hydrogel is then washed and filtered to remove soluble contaminants, and then dried to a finely divided powder. If the catalyst is to be promoted with potassium or other alkali metal, the powdered alumina may be slurried with an aqueous solution of a heat decomposable alkali metal salt, the resulting slurry then being dried and formed into pellets, extrudates, or similar particles. The activity stabilizing effect of alkali metal oxides on chromia-alumina catalysts is disclosed in U.S. Patent 2,943,067 to R. P. Sieg. The alumina should have a surface area above about 200 m.$^2$/gm. (square meters per gram) as determined by nitrogen adsorption.

The alumina carrier is thermally treated by heating at temperatures of 1100–1600° F. for from 2–24 hours, the lower temperatures necessitating longer contact times. The time and temperature of treatment are controlled to avoid the formation of alpha-alumina and may depend upon the properties of the particular alumina. In selecting the proper time and temperature, the conditions should be such as to reduce the surface area of the alumina as determined by nitrogen adsorption to about 100 m.$^2$/gm. or less, but not below about 60 m.$^2$/gm. When the alumina surface area is below 60 m.$^2$/gm., the finished catalyst is less active. Higher areas than 100 m.$^2$/gm. seem to result in excessive coke formation in the dehydrogenation process. Good results are obtained by using superheated steam at a temperature of about 1500° F. for about 6 hours. The area reduction may also be accomplished by air calcination. However, the use of steam is preferred because the time required is less and/or lower temperatures may be employed. More particularly, the selectivity of the novel catalysts disclosed herein for the promotion of dehydrogenation reactions appears to be enhanced when steam is used.

The thermally treated alumina is then impregnated with chromium oxide by immersion in a concentrated solution of chromic acid or a heat decomposable salt, such as chromic nitrate, ammonium dichromate, and the like, the solution strength and impregnation time being sufficient to provide 20–40 percent $Cr_2O_3$ on the finished catalyst, preferably 25–40 percent $Cr_2O_3$. Catalysts exhibiting the desired properties to the greatest extent contain more than 25 percent $Cr_2O_3$. Instead of incorporating the potassium or other alkali metal promoter in the preparation of the alumina, a small amount of an alkali metal salt, such as potassium dichromate, may be included in the impregnating solution. Preferably, the finished catalyst contains 0.1–0.5 weight percent $K_2O$.

As the final step in the preparation of the catalyst, the impregnated alumina is heated to decompose the chromium compound to $Cr_2O_3$ in an oxygen-free atmosphere, at temperatures of 1100–1700° F. for from 2–48 hours. By "oxygen-free" is meant that the hot gas must be free of gases which could give $CrO_3$ on the catalyst. The preferred treating agent is dry nitrogen or other inert gas, but hydrogen may also be used. The conditions of time and temperature should be such as to reduce the active chromia surface area as determined by carbon monoxide chemisorption to less than 15 micromoles of CO per gram of catalyst, preferably 8–12 micromoles CO/gm. The activity of catalysts having chromia surface areas below about 6 micromoles CO/gm. is quite low. The conditions should not be so severe as to result in a further reduction of the alumina surface area as measured by nitrogen adsorption to below about 50 m.$^2$/gm. For example, good results are obtained by treating the impregnated alumina at about 1600° F. for about 6 hours in nitrogen, but lower temperatures may be used if longer treating times are employed.

Measurement of the active chromia surface area in terms of carbon monoxide chemisorption is based on the observation that carbon monoxide is strongly chemisorbed by the catalytically active transition metals and lower valent metal oxides and only weakly adsorbed, or not at all, by alumina or silica supports. The carbon monoxide chemisorption data reported herein were obtained by a flow adsorption method wherein a known gas mixture of carbon monoxide containing carbon-14 monoxide in helium is passed at room temperature and pressure (3.5 mm. Hg CO partial pressure) and at a constant rate over a weighed prereduced catalyst sample in equipment of known volume. From the time required before carbon-14 monoxide appears in the effluent helium, as detected by a Geiger counter, the volume of carbon monoxide adsorbed is calculated. The detailed procedure is set forth in a paper entitled, "Flow Adsorption Method for Catalyst Metal Surface Measurement," presented at the Symposium, Division of Petroleum Chemistry of the A.C.S., in Boston, Massachusetts, April 5–10, 1959, by T. R. Hughes, R. J. Houston, and R. P. Sieg. The dehydrogenation activity of chromia-alumina catalysts has been found to be directly related to the chromia surface area as measured by CO chemisorption. As hereinbefore mentioned, catalyst aging and deactivation in the cyclic adiabatic dehydrogenation process is accompanied by, and appears to be caused by, a reduction in the active chromia surface area.

The following example illustrates the preparation of a catalyst in accordance with this invention.

EXAMPLE 1

Four and one-half liters of a preformed hydrous alumina gel in the form of 3/16" extrusions was contacted with superheated steam at 1500° F. for 6 hours. At the conclusion of this treatment, the alumina particles had an average surface area as determined by nitrogen adsorption of 93 m.$^2$/gm. as compared to an initial surface area of 372 m.$^2$/gm. The alumina particles were then impregnated with chromia by immersion for one hour in a concentrated solution prepared by dissolving 4440 grams of $CrO_3$ and 65 grams of KOH in 4½ liters of water. The impregnated particles were drained free of excess solution, and were then contacted with dry nitrogen at 1500° F. for 24 hours. The finished catalyst analyzed 27 weight percent $Cr_2O_3$ and 0.28 weight percent $K_2O$, the balance being alumina. The nitrogen surface area was 72 m.$^2$/gm., and the active chromia surface area was 10 micromoles of CO per gram. The catalyst exhibited the X-ray diffraction pattern of theta-alumina.

The following example illustrates another preparation of the catalyst using somewhat modified conditions.

EXAMPLE 2

Ten liters of an alumina extrudate having a nitrogen surface area of 402 m.$^2$/gm. was treated with steam at 1500° F. for 7 hours. The alumina surface area was reduced to 101 m.$^2$/gm. This material was dipped for 3 hours in an aqueous solution of 12,100 gm. $CrO_3$ and 145 gm. KOH in 10 liters of water. The impregnated extrudate was then drained free of excess solution for 2 hours. The material was then exposed to nitrogen at 1400° F. for 6 hours. The finished catalyst contained 29.5% $Cr_2O_3$ and 0.16% $K_2O$, by weight, and had a surface area by nitrogen adsorption of 71 m.$^2$/gm. This catalyst will be found to have a chromia surface area very close to that of the catalyst prepared in Example 1.

The manner in which catalyst properties and changes therein with age influence the operation of the butane dehydrogenation process may be better understood by reference to FIGURE 1. This graph represents typical smoothed data obtained during the operation of a full-scale multiple reactor adiabatic unit using a commercial 5/32" pelleted dehydrogenation catalyst comprising 20 percent $Cr_2O_3$ and 80 percent alumina, hereinafter referred to as catalyst B. This unit operates at a pressure of 20 centimeters Hg absolute, with a cycle time of 17½ minutes: 7½ minutes each on reaction and regeneration, with 2½ minutes for purging and valve changes. As indicated on FIGURE 1, the plant is started up using low butane feed and air inlet temperatures in order to avoid wild erratic operation. (In this unit the regeneration air is preheated to the same inlet temperature as the feed.) The temperature is soon raised to the desired operating level of about 1060° F. Immediately, the catalyst activity begins to decline, and it is necessary to begin raising the feed inlet temperature in order to maintain a high percentage conversion per pass to butenes, of about 32 percent. After about one week of operation the feed inlet temperature is at about 1100° F., at which time the percent conversion to butenes is still satisfactory. After the catalyst has been in use for about 6 weeks, the feed and air inlet temperatures reach 1175° F., which is the maximum allowable temperature in this unit. Thereafter, the catalyst activity continues to decline, and it is not possible to make furher compensatory adjustment by raising the temperatures. Consequently, the per pass conversion of butane to butenes drops off. After about 3 months of operation the dehydrogenation activity of the catalyst has declined relative to the coke-forming activity such that excessively high temperatures are reached during the regeneration cycle. Consequently, it is necessary to begin reducing the feed temperature, to about 1140° F. at about 4 months, further lowering the percent conversion, to about 25 percent, as shown in FIGURE 1. Finally, after 5 months of operation the process has become uneconomical, and it is necessary to shut down and replace the catalyst.

The following example presents a comparison of the catalyst of the present invention with catalyst B, illustrating the changes in active chromia surface area occurring during exposure to such typical operating conditions.

EXAMPLE 3

Samples of catalyst B and the catalyst prepared in Example 1 were placed within one of the beds of commercial catalyst B in the full scale unit described above, in a small cannister having a height equal to the catalyst bed depth (about 40"). In this way the catalyst of the present invention was exposed to exactly the same conditions as catalyst B, but operation of the process was dictated by the properties of the latter catalyst. Samples of the mixed catalysts were withdrawn from the reactor during the run through a special blow tube installed for that purpose. The active chromia surface area of each catalyst at various time intervals was measured by CO chemisorption. The changes in the properties of the catalysts during use are summarized in the following Table I, from which it is seen that the active chromia surface area of the catalyst of this invention increased during the first two weeks of plant exposure and thereafter declined very slowly, whereas the active chromia surface of catalyst B was initially higher but declined more rapidly and at all times.

*Table I*

| Days, Plant Exposure | 0 | 7 | 14 | 30 | 70 | [1] 150 |
|---|---|---|---|---|---|---|
| Active Chromia Surface Area, μmoles CO/gm.: | | | | | | |
| Catalyst B | 14 | 12 | 9 | 8 | 6 | 4 |
| Catalyst of Example 1 | 10 | 13 | 16 | 15 | 13 | 10 |

[1] End of run.

In Example 3, the butane dehydrogenation process was operated for maximum butene yield, using relatively pure butane as the feed. When it is desired to maximize butadiene production, it is advantageous to recycle a major portion of the butenes to the feed. The unusual properties of the novel catalysts disclosed herein make their use of particular value in this latter type of operation also. Increasing activity is again observed, and the activity remains high for a longer time than previously known catalysts. To further illustrate the above features, the following example is presented.

EXAMPLE 4

Samples of the catalyst prepared in Example 2 together with samples of catalyst B and another commercial catalyst, hereinafter referred to as catalyst A, comprising 1/8" extrudate containing 20 percent $Cr_2O_3$ and 80 percent alumina, were placed within a bed of catalyst A. In this way, all three catalysts were exposed to exactly the same conditions, but operation of the process was dictated by the properties of catalyst A. The catalyst beds in the various reactors of the unit comprised a 50–50 mixture of catalytically inert alundum balls and catalyst A. Operation was similar to that previously described, except that a 30-minute cycle was used and the butane feed contained about 10 percent n-butene. Samples of each catalyst were withdrawn during the first two months of the run. These samples were then tested in a laboratory micro-reactor under isothermal conditions for direct activity comparisons. The conditions used in the micro-reactor test were 1050° F., 1 atmosphere pressure, 2 v./v./hr., and 10 minutes each on feed and regeneration cycle. The changes in the activities of the catalysts due to the plant exposure are summarized in the following Table II.

Table II

| Days, Plant Exposure | 0 | 15 Days | 1 Month | 2 Months |
|---|---|---|---|---|
| Isothermal Microreactor Test: | | | | |
| Wt. Percent Butane Converted— | | | | |
| Catalyst A | 48.1 | | 45.5 | 42.6 |
| Catalyst B | 52.5 | 46.3 | 45.8 | 45.4 |
| Catalyst of Example 2 | 45.5 | 48.3 | 48.8 | 50.7 |
| Wt. Percent Conversion to Butenes— | | | | |
| Catalyst A | 39.9 | | 37.8 | 35.3 |
| Catalyst B | 39.5 | 37.4 | 37.2 | 37.6 |
| Catalyst of Example 2 | 36.0 | 38.9 | 38.6 | 40.7 |
| Wt. Percent Conversion to Butadiene— | | | | |
| Catalyst A | 1.4 | | 1.6 | 1.7 |
| Catalyst B | 1.6 | 2.1 | 1.9 | 1.9 |
| Catalyst of Example 2 | 1.9 | 2.0 | 1.8 | 2.1 |

Again, it is seen that the catalyst prepared in accordance with this invention was initially less active than either of the conventional catalysts, but that its dehydrogenation activity increased during use to a higher level and remained higher than that of the other catalysts.

Figure 2:
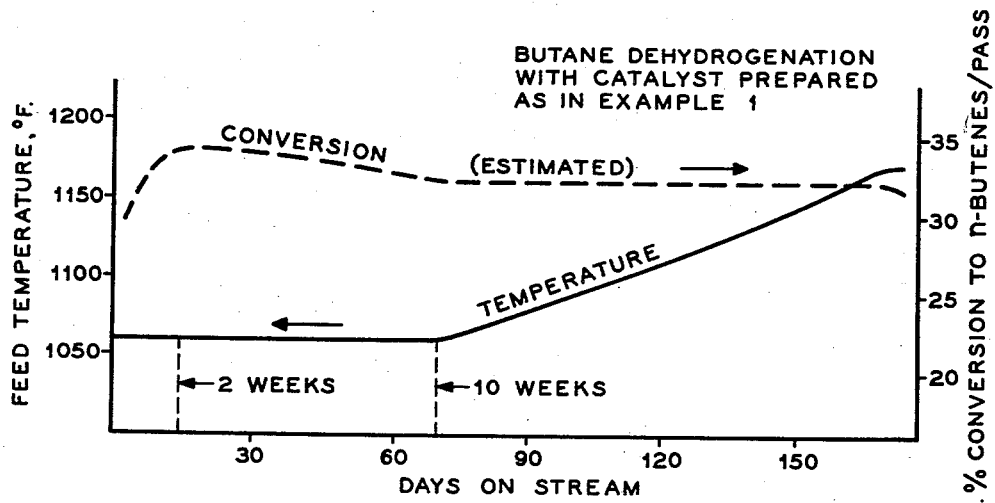

From the above data it is apparent that in using the improved catalysts of the present invention in the butane dehydrogenation process an entirely different type of operation may be followed as compared to that shown in FIGURE 1. Referring to FIGURE 2, it is seen that since the catalyst is not overly active initially, it is posisble to bring the plant quickly on-stream at about 1060° F. or higher. During the first two weeks of operation, i.e., based on the data of Table I, the catalyst is characterized by increasing activity such that by maintaining the feed inlet temperature at about 1060° F. an increase in butane conversion to butenes is observed. This is in contrast to the operation shown in FIGURE 1 with catalyst B, wherein it was necessary to raise the operating temperature to maintain a given conversion rate. Thereafter, the catalyst of the present invention is characterized by a relatively stable activity, and the process continues at about the same temperature and conversion level for several weeks. Ultimately, at about 10 weeks based on the data of Table I, the dehydrogenation activity begins to decline in the same manner as the previously used catalysts, although at a much slower rate, and gradually increasing feed inlet temperatures are resorted to in order to maintain the desired high percentage conversion. When it is no longer possible to compensate for the activity decline by further temperature increases, the process is continued at the maximum allowable temperature. It would appear that this point is not reached until a time at which ordinary catalysts would be inactive. Finally, when the activity has fallen to an uneconomic level, the operation is discontinued (not shown on FIGURE 2). It is found that the catalysts of the present invention can be kept in service approximately twice as long as the best catalyst heretofore used.

It is also noted that at all times after the initial period of use a higher per pass conversion to butenes is obtained. Increased conversion could be obtained during that initial period also by raising the temperature as was done when using the conventional catalyst. Thus, the novel catalysts disclosed herein may be used in the dehydrogenation process either as a means of extending the time between catalyst replacements by operating at a sustained lower average temperature, as above, or as a means of increasing the per pass conversion by operating at the higher temperatures. Preferably, both advantages are obtained—at intermediate temperatures.

We claim:

1. A chromia-alumina dehydrogenation catalyst containing between 25 and 40 weight percent $Cr_2O_3$, having an active chromia surface area as measured by CO chemisorption of less than 15 micromoles CO per gram and an alumina surface area as measured by nitrogen adsorption of at least 50 square meters per gram, said catalyst having been produced by a method comprising impregnating alumina, which was prepared by heat treating a high surface area alumina at 1100–1600° F. for 2–24 hours to reduce its surface area to between about 60 and about 100 square meters per gram as measured by nitrogen adsorption, with a chromium compound decomposable to $Cr_2O_3$, and then heating the chromium-impregnated alumina in an oxygen-free atmosphere at 1100–1700° F. for 2–48 hours to obtain the first-mentioned chromia and alumina surface areas.

2. The catalyst of claim 1 containing between 0.1 and 0.5 weight percent $K_2O$.

3. A process for the dehydrogenation of butane to butenes and butadiene which comprises passing alternately and repeatedly through a bed of a catalyst of claim 1, first, butane vapors at 900–1100° F. and 1–10 p.s.i.a. to dehydrogenate butane and to deposit coke on the catalyst, and second, an oxygen-containing gas at 900–1100° F. to remove deposited coke by combustion causing elevation of the bed temperature, whereby the dehydrogenation activity of said catalyst increases during an initial period of use, thereafter remains relatively stable, and ultimately declines slowly, maintaining the temperatures of butane vapors and oxygen-containing gas below about 1100° F. during said initial period of use and thereafter for at least ten weeks and until said activity has declined substantially, then increasing said temperatures gradually towards 1200° F., and continuing alternately and repeatedly passing butane vapors and oxygen-containing gas for a period in excess of five months at a per pass conversion of butane to butenes in excess of 25%.

References Cited by the Examiner
UNITED STATES PATENTS

| | | | |
|---|---|---|---|
| 2,706,741 | 4/55 | Sieg et al. | 260—680 |
| 2,809,170 | 10/57 | Cornelius et al. | 252—465 |
| 2,857,442 | 10/58 | Hay | 252—465 |
| 2,890,162 | 6/59 | Anderson et al. | 252—465 |
| 2,905,632 | 9/59 | Gladrow et al. | 252—465 |
| 2,943,067 | 6/60 | Sieg | 252—465 |
| 3,064,062 | 11/62 | Lorz et al. | 260—680 |

ALPHONSO D. SULLIVAN, *Primary Examiner.*